US008983095B2

(12) United States Patent
Matsumoto

(10) Patent No.: US 8,983,095 B2
(45) Date of Patent: Mar. 17, 2015

(54) DRIVER CIRCUIT

(75) Inventor: Yoshitaka Matsumoto, Gunma-ken (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 393 days.

(21) Appl. No.: 13/355,026

(22) Filed: Jan. 20, 2012

(65) Prior Publication Data

US 2012/0189141 A1 Jul. 26, 2012

(30) Foreign Application Priority Data

Jan. 20, 2011 (JP) ................................. 2011-009395

(51) Int. Cl.
*H02B 1/00* (2006.01)
*H04R 3/00* (2006.01)

(52) U.S. Cl.
CPC ..................................... *H04R 3/007* (2013.01)
USPC .............................. 381/123; 330/10; 330/251

(58) Field of Classification Search
CPC ............. H03F 3/58; H03F 3/52; H03F 3/217; H03F 3/68
USPC ........ 381/106, 123; 330/10, 51, 251; 375/238
See application file for complete search history.

(56) References Cited

U.S. PATENT DOCUMENTS 6,621,336 B1 * 9/2003 Johnson .......................... 330/51
7,078,964 B2 * 7/2006 Risbo et al. ..................... 330/10
7,157,968 B2 * 1/2007 Shin .............................. 330/251
2004/0036531 A1 * 2/2004 Trevelyan ........................ 330/10
2005/0083114 A1 * 4/2005 Risbo .............................. 330/10
2005/0253648 A1 * 11/2005 Shin ................................ 330/10
2007/0116109 A1 * 5/2007 Stanley .......................... 375/238
2009/0179709 A1 * 7/2009 Zhu et al. ....................... 332/109
2009/0219090 A1 * 9/2009 Wong et al. ................... 330/251
2009/0284886 A1 11/2009 Matsumoto
2010/0109773 A1 * 5/2010 Takagi .......................... 330/251
2010/0266144 A1 * 10/2010 Chiu et al. .................... 381/106
2013/0089223 A1 * 4/2013 Heineman et al. ............ 381/120

FOREIGN PATENT DOCUMENTS

JP 2000151297 A 5/2000
JP 2009044280 A 2/2009

OTHER PUBLICATIONS

Espacenet, Patent Abstract for Japanese Publication No. 2000151297 Published May 30, 2000 (1 page).
Espacenet, Patent Abstract for Japanese Publication No. 200944280 Published Feb. 26, 2009 (1 page).

* cited by examiner

*Primary Examiner* — Xu Mei
*Assistant Examiner* — Ubachukwu Odunukwe

(57) ABSTRACT

A pair of PWM signals having mutually opposite or identical phases is applied to both terminals of a load to drive the load. An anomaly detection circuit detects a state of change in the pair of PWM signals (PWM+ and PWM−), performs counting operation when at least one PWM signal stops changing, and outputs an anomaly detection signal when the count value becomes a predetermined value.

13 Claims, 4 Drawing Sheets

DRIVER CIRCUIT

CROSS-REFERENCE TO RELATED APPLICATION(S)

The entire disclosure of Japanese Patent Application No. 2011-9395 filed on Jan. 20, 2011, including specification, claims, drawings, and abstract, is incorporated herein by reference in its entirety

BACKGROUND

1. Technical Field

The present invention relates to a driver circuit for driving a load by applying a pair of PWM signals having mutually opposite or identical phases to both terminals of the load.

2. Background Art

A driver circuit for driving a load in a bridged transformer less (BTL) configuration by applying driving signals having opposite or identical phases to both terminals of a load, such as a speaker, is well known. Furthermore, also well known is a class D amplifier for performing simple on-off switching operations of output stage transistors using PWM signals as the driving signals of the driver circuit.

PRIOR ART DOCUMENT

Patent Document

Patent Document 1: Japanese Patent Laid-Open Publication No. Hei 2009-44280

SUMMARY

When PWM signals are fixed and output stage transistors are fixed to an on state in the driver circuit, DC current flows to the speaker and there are instances where the speaker becomes damaged. The driver circuit is provided with an over-current prevention circuit to prevent large currents, such as due to short circuits. However, even though a current value may be comparatively small, the speaker will become damaged if the DC current continues to flow.

The present invention includes, in a driver circuit for driving a load by applying PWM signals to both terminals of the load, a detection circuit for detecting state of change in the PWM signals, a counter for performing counting operation when PWM signals stop changing in the detection circuit, and an anomaly detection circuit for outputting an anomaly detection signal when a count value of the counter becomes a predetermined value.

According to the present invention, anomalies in PWM signals are detected so that reliable anomaly detection is performed to enable the drive current to be stopped on the basis of the detection signal.

DETAILED DESCRIPTION

An embodiment of the present invention will be described hereinafter with reference to the attached drawings.

Figure 1:
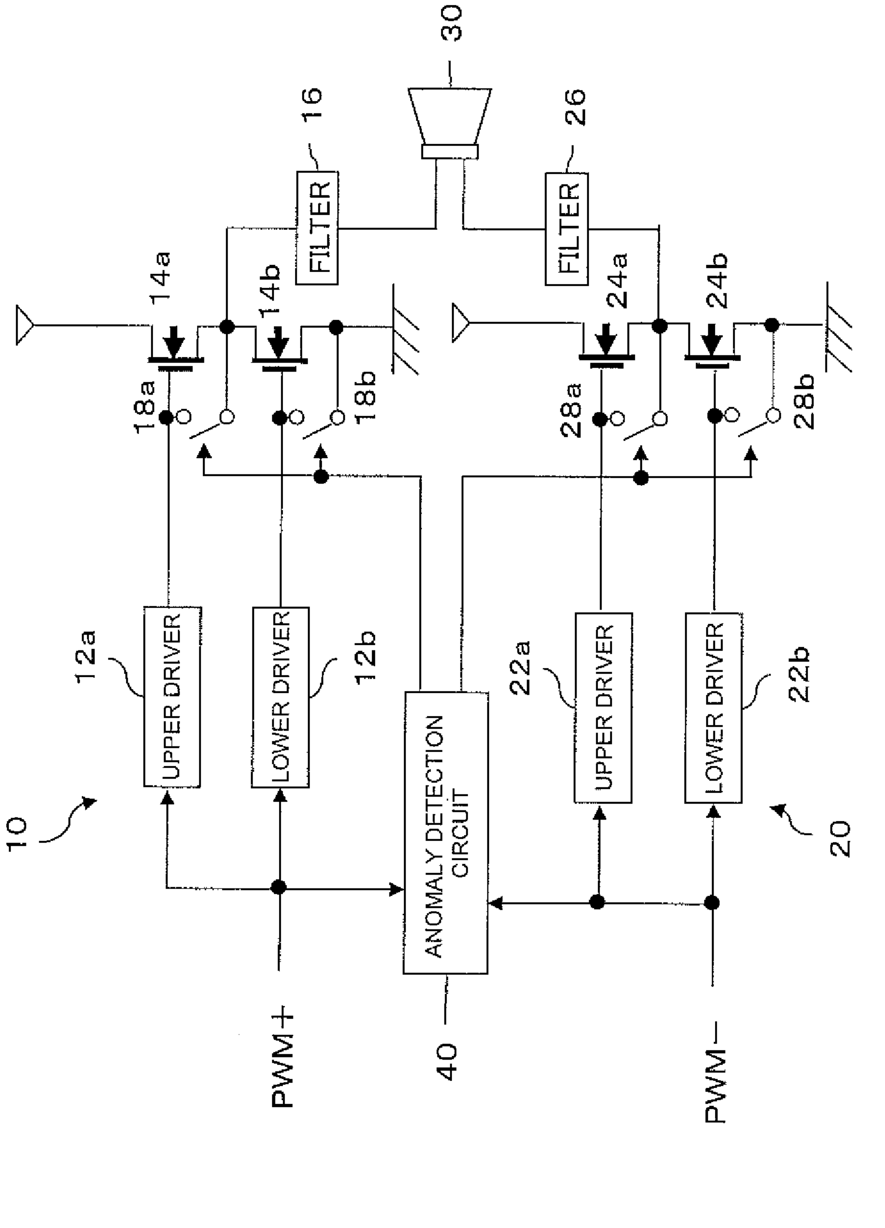
FIG. 1 shows a configuration for audio signal output including a driver circuit.

FIG. 1 shows a configuration of a driver circuit relating to an embodiment. An audio signal is subjected to PWM conversion to produce PWM signals, PWM+ and PWM−, which have mutually opposite or identical phases. PWM+ is supplied to gates of output transistors 14*a* and 14*b* via an upper driver 12*a* and a lower driver 12*b* of a driver unit 10. Furthermore, PWM− is supplied to gates of output transistors 24*a* and 24*b* via an upper driver 22*a* and a lower driver 22*b* of another driver unit 20. Although N-channel transistors were used for the output transistors 14*a* and 14*b*, another type may be used.

One terminal of a speaker 30 is connected to a point between the output transistors 14*a* and 14*b* and another terminal of the speaker 30 is connected to a point between the output transistors 24*a* and 24*b*. When the output transistors 14*a* and 24*b* are on, current flows to the speaker 30 from top to bottom in the figure, and when the output transistors 14*b* and 24*a* are on, current flows to the speaker 30 from bottom to top in the figure. Namely, when the audio signal is positive, current flows to the speaker 30 in one direction, and when the audio signal is negative, current flows to the speaker 30 in the opposite direction.

PWM+ and PWM−, which are produced from the audio signal, are signals having opposite or identical phases produced from one audio signal, and the speaker 30 is BTL driven by the above-mentioned configuration. PWM+ and PWM− are signals repeating H and L levels at a PWM carrier frequency and the duty ratio is controlled in accordance with the amplitude of the audio signal. Furthermore, in the path to the speaker 30 are arranged filters 16 and 26, which are low-pass filters formed from inductors and capacitors, for example, to smoothen the output based on PWM control.

In the present embodiment, PWM+ and PWM− are input by an anomaly detection circuit 40. From the state of PWM+ and PWM−, the anomaly detection circuit 40 detects anomalies in these signals. When an anomaly is detected, the anomaly detection circuit 40 controls switches 18*a*, 18*b*, 28*a*, and 28*b* and sets the voltages between the gate and source of the four output transistors 14*a*, 14*b*, 24*a*, and 24*b* to zero to turn them all off. As a result, the drive current flowing to the speaker 30 is turned off.

Figure 2:
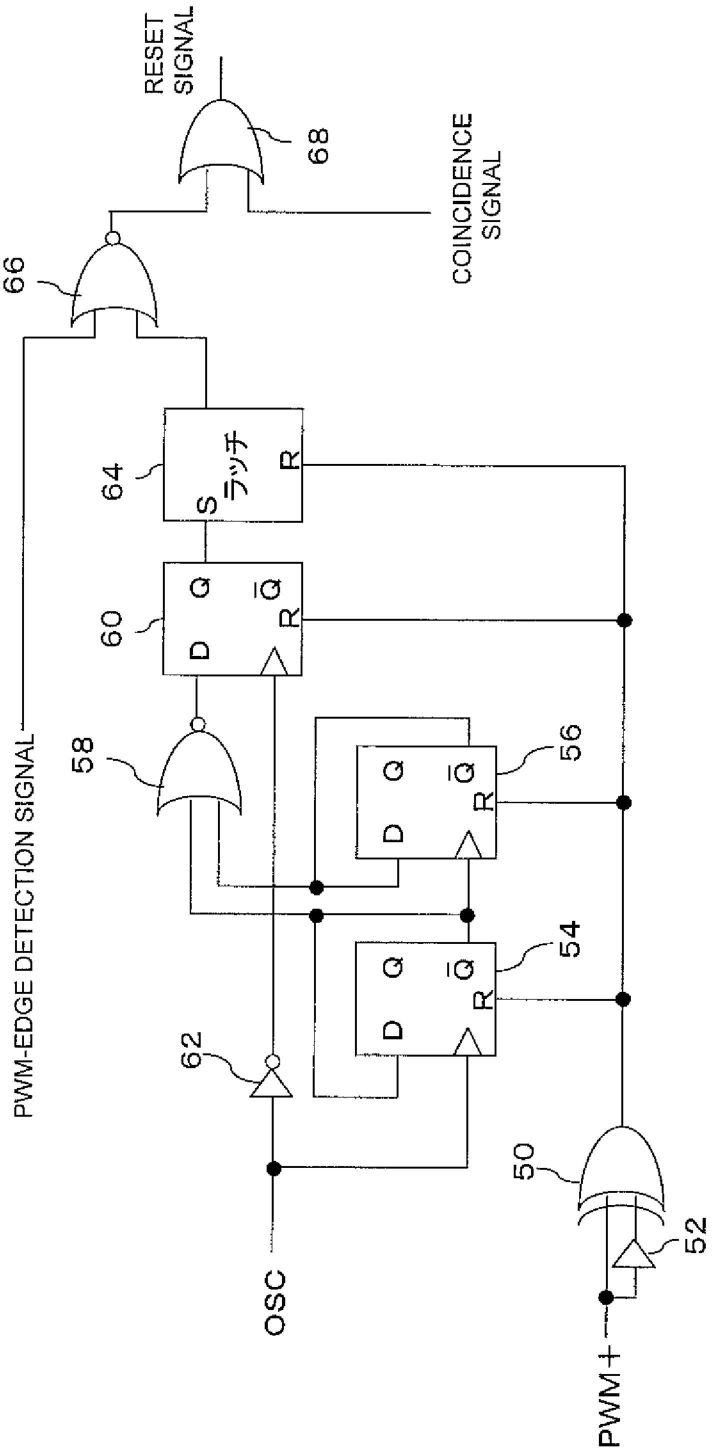
FIG. 2 shows a circuit for reset signal generation.
Figure 3:
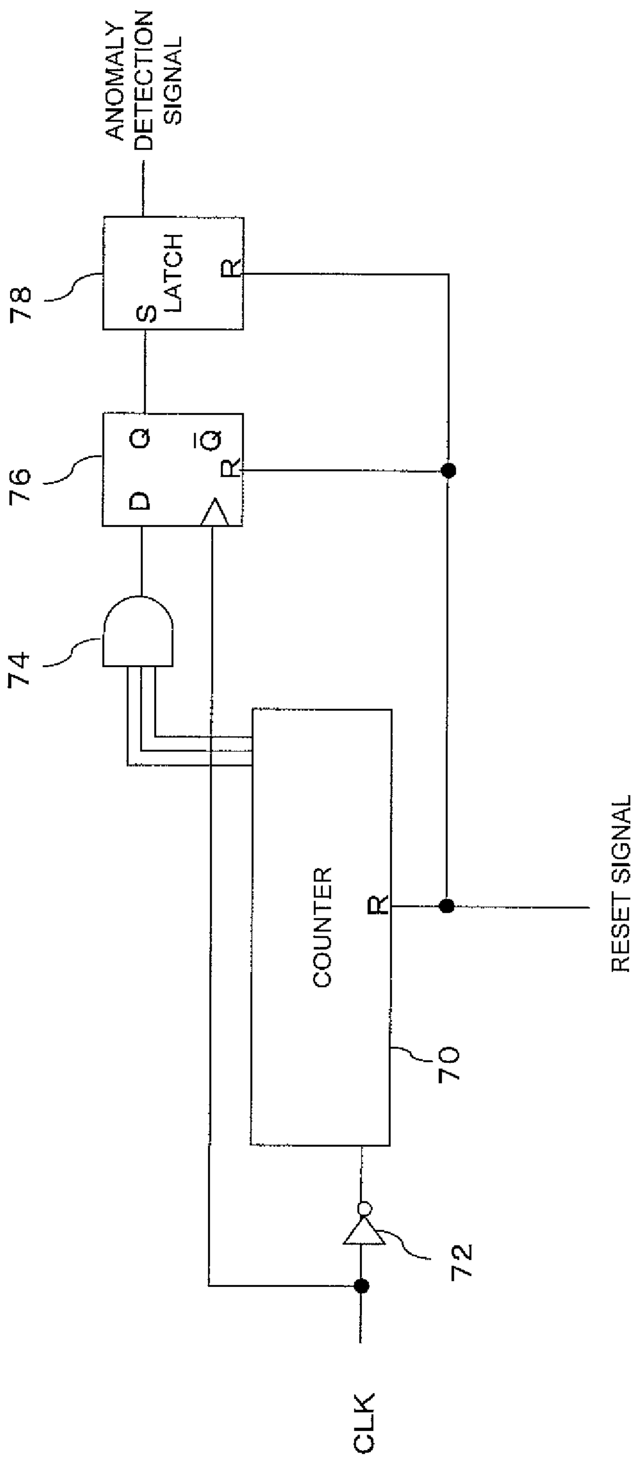
FIG. 3 shows a circuit for anomaly detection signal generation.

An example configuration of the anomaly detection circuit 40 is shown in FIG. 2. Since the configuration for detecting an anomaly by being unable to detect an edge is the same for either PWM+ or PWM−, only the configuration for PWM+ is shown in FIG. 2.

The PWM signal (PWM+) is input by one terminal of an EXOR gate 50 and also delayed by a predetermined duration via an amplifier 52 and input by the other terminal of the EXOR gate 50. As a result, with regard to PWM+, a comparison is made with the signal delayed by a predetermined duration and an H level is output from the EXOR 50 only for the delay duration at the leading edge and trailing edge.

On the other hand, a signal OSC having the same frequency as the carrier frequency of the PWM signal is input by a clock input terminal of a flip-flop 54. An inverting output xQ (Q upper bar) of the flip-flop 54 is input by the data input terminal D and also is input by a clock input terminal of a flip-flop 56. An inverting output xQ of the flip-flop 56 is also input by its data input terminal D. Thus, the flip-flops 54 and 56 operate as a 2-bit counter. Furthermore, to the reset terminals of the flip-flops 54 and 56 is supplied the output of the EXOR gate 50. Therefore, the values of the flip-flops 54 and 56 are reset to 0, 0 when an edge has been detected, and change in a sequence of 0, 0→1, 0→0, 1→1, 0→1, 1 at every rise of OSC in a period where an edge is not detected.

The inverting outputs of the flip-flops 54 and 56 are input by a NOR gate 58. When the values of the flip-flops 54 and 56 become 1,1, the inputs to the NOR gate 58 become 0,0 and the output of the NOR gate 58 becomes 1 (H level). Namely, the signal OSC rises four times while the edge of PWM+ is not detected so that an H level is output from the NOR gate 58.

The output of the NOR gate 58 is input by a D input terminal of a flip-flop 60. The signal OSC is inverted by an inverter 62 and input by the clock input terminal of the flip-flop 60. Therefore, the H level of the NOR gate 58 is delayed by a half clock (by the fall of the signal OSC) and fed to the flip-flop 60.

The Q output of the flip-flop 60 is input by a set terminal of a latch 64. Thus, the values of the flip-flops 54 and 56 change from 1,1 to 0,0 at the rise of the signal OSC and the output of the NOR gate 58 becomes an L level, which even if fed to the flip-flop 60 results in the output of the latch 64 maintaining an H level.

The output of the EXOR 50 is input by the reset terminals of the flip-flop 60 and the latch 64. When an edge of PWM+ is detected, the flip-flop 60 and the latch 64 are reset to an L level.

The output of the latch 64 is supplied to a NOR gate 66. Here, in the embodiment, the same circuit is included also for PWM− and the output of the circuit thereof (no-edge detection circuit) is input by the other input terminal of the NOR gate 66. Therefore, the NOR gate 66 outputs an L level when an edge is not detected for a predetermined time or longer for either or both PWM+ and PWM− and outputs an H level normally when an edge is periodically detected.

The output of the NOR gate 66 is supplied to an OR gate 68. To the OR gate 68 is supplied a coincidence signal, which becomes an H level when PWM+ and PWM− coincide in a state where an edge cannot be detected for both PWM+ and PWM−. Therefore, a reset signal is not output during an anomaly when PWM+ and PWM− are fixed at the same level. The coincidence signal can be easily generated, for example, by taking the AND of the outputs of the two no-edge detection circuits and the AND of the EXNOR of PWM+ and PWM−.

The reset signal, which is the output of the OR gate 68, is input by a reset input terminal of a counter 70. A predetermined clock CLK is inverted by an inverter 72 and supplied to the counter 70. Therefore, when an edge is not detected for either PWM+ or PWM−, the counter 70 counts up. Predetermined bits (3 high-order bits in this example) of the counter 70 are input by D input terminals of an AND gate 74. Therefore, the AND gate 74 outputs an H level when the count value of the counter 70 becomes a predetermined value or higher. For example, if a period causing speaker damage due to DC current is approximately 300 ms, the predetermined value of the counter 70 is set to that time or slightly less.

The output of the AND gate 74 is input by a D input terminal of a flip-flop 76. The clock input terminal of the flip-flop 76 inputs CLK so that the H level of the AND gate 74 is input at a half clock delay. The Q output of the flip-flop 76 is input by a set terminal of a latch 78 and the output of the latch 78 becomes the output of the anomaly detection circuit 40. When the output of the latch 78 becomes an H level, the four output transistors 14*a*, 14*b*, 24*a*, and 24*b* shown in FIG. 1 are all turned off and drive current flowing to the speaker 30 is turned off.

Figures 4A, 4B, 4C, 4D:
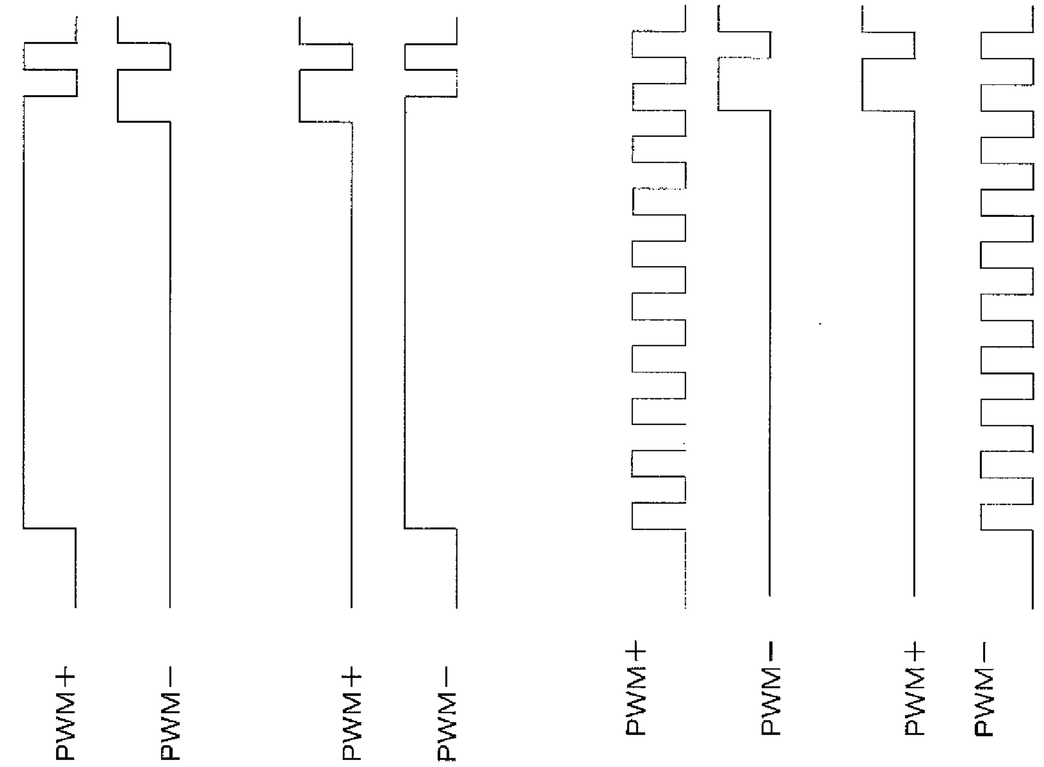
FIGS. 4A, 4B, 4C, and 4D show examples of anomalies.

FIGS. 4A, 4B, 4C, and 4D show examples where either PWM+ or PWM− does not have edges. In FIG. 4A, PWM+ is fixed at an H level, and in FIG. 4B, PWM− is fixed at an H level. When this condition occurs, a state where the output transistors 14*a* and 24*b* (or 14*b* and 24*a*) in FIG. 1 are on continues and a large DC current flows to the speaker 30. In FIG. 4C, PWM+ repeats Hand L levels, and in FIG. 4D, PWM repeats H and L levels. However, in FIG. 4C, PWM− is fixed at the L level, and in FIG. 4D, PWM+ is fixed at the L level. In this case, the state where the output transistors 14*a* and 24*b* in FIG. 1 are on continues and DC current flows to the speaker 30. Furthermore, if the PWM signal has an opposite fixed polarity, a DC current of the opposite direction flows to the speaker 30.

According to the embodiment, this type of anomaly is detected by monitoring the state where the edge of the PWM signal is not detected. Therefore, it becomes possible to prevent damage to the speaker 30 by reliably detecting anomalies.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A driver circuit for driving a load by applying first and second digital PWM signals to the load, comprising an anomaly detection circuit, the anomaly detection circuit comprising:

a first no-edge detection circuit for activating a first no-edge detection signal in response to detecting that the first digital PWM signal changes state within a first predetermined period of time;

a second no-edge detection circuit for activating a second no-edge detection signal in response to detecting that the second digital PWM signal changes state within said first predetermined period of time; and a logic circuit for activating a reset signal in response to both said first and second no-edge detection signals being inactive, wherein the logic circuit further has an input for receiving a coincidence signal indicative of a coincidence in logic state of said first and second digital PWM signals when said first and second no-edge detection signals are inactive, the anomaly detection circuit outputting an anomaly detection signal in response to said reset signal being inactive for a second predetermined period of time.

2. The driver circuit of claim 1 wherein each of said first and second no-edge detection circuits comprise:

a transition detector for providing a comparison signal in response to a transition in a respective one of the first and second digital PWM signals, wherein said respective one of said first and second no-edge detection circuits keeps a corresponding no-edge detection signal inactive as long as the comparison signal is activated within said predetermined period of time.

3. The driver circuit of claim 2 wherein each of said first and second no-edge detection circuits further comprise:

a counter circuit for counting a number of transitions of an oscillator signal while said comparison signal is inactive, wherein said no-edge detection circuit activates said corresponding one of said first and second no-edge detection signals in response to said counter circuit reaching a first predetermined value.

4. The driver circuit of claim 3, wherein the anomaly detection circuit further comprises:

a counter for counting in response to a clock signal until reset by said reset signal, the anomaly detection circuit outputting said anomaly detection signal in response to a count of said counter reaching a second predetermined value, said second predetermined value higher than said first predetermined value.

5. The driver circuit of claim 2 wherein the transition detector comprises:

an amplifier having an input for receiving said respective one of the first and second digital PWM signals, and an output; and an exclusive logic gate having a first input for receiving said respective one of the first and second digital PWM signals, a second input coupled to the output of the amplifier, and an output for providing the comparison signal.

6. The driver circuit of claim 1, wherein the anomaly detection circuit further comprises:

a counter for counting in response to a clock signal until reset by said reset signal, the anomaly detection circuit outputting said anomaly detection signal in response to a count of said counter reaching a second predetermined value.

7. The driver circuit of claim 1 wherein said first and second digital PWM signals have mutually opposite phases when there is no anomaly.

8. A method for use in an audio output circuit comprising:

receiving a first digital PWM signal for driving a load;

receiving a second digital PWM signal for driving said load;

activating a first no-edge detection signal when said first digital PWM signal does not change state within a first predetermined period of time;

activating a second no-edge detection signal when said second digital PWM signal does not change state within said first predetermined period of time;

activating an anomaly detection signal in response to an activation of at least one of said first and second no-edge detection signals during a second predetermined period of time;

activating a coincidence signal when said first and second digital PWM signals coincide in state in response to an activation of both said first and second no-edge detection signals; and keeping said anomaly detection signal inactive in response to an activation of said coincidence signal.

9. The method of claim 8, wherein said activating said first no-edge detection signal comprises:

detecting whether or not said first digital PWM signal has a transition;

counting cycles of a first clock signal while said first digital PWM said does not have said transition;

resetting said counting in response to detecting said transition; and activating said first no-edge detection signal in response to counting a first predetermined number of cycles of said first clock signal without said resetting.

10. The method of claim 9, wherein said activating said second no-edge detection signal comprises:

detecting whether or not said second digital PWM signal has a transition;

counting cycles of said first clock signal while said second digital PWM said does not have said transition;

resetting said counting in response to said transition; and activating said second no-edge detection signal in response to counting said first predetermined number of cycles of said first clock signal without said resetting.

11. The method of claim 9 wherein said activating said anomaly detection signal comprises:

counting cycles of a second clock signal while at least one of said first and second no-edge detection signals is active;

resetting said counting cycles of said second clock signal in response to both said first no-edge detection signal and said second no-edge detection signal being inactive; and activating said anomaly detection signal in response to counting a second predetermined number of cycles of said second clock signal without said resetting said counting cycles of said second clock signal.

12. The method of claim 11 wherein said activating said anomaly detection signal in response to counting said second predetermined number of cycles of said second clock signal comprises:

activating said anomaly detection signal in response to counting said second predetermined number of cycles of said second clock signal larger than said first predetermined number.

13. The method of claim 8 wherein said activating said anomaly detection signal comprises:

counting cycles of a second clock signal while at least one of said first and second no-edge detection signals is active;

resetting said counting cycles of said second clock signal in response to both said first no-edge detection signal and said second no-edge detection signal being inactive; and activating said anomaly detection signal in response to counting a second predetermined number of cycles of said second clock signal without said resetting said counting cycles of said second clock signal.

* * * * *